United States Patent
Meurer et al.

(10) Patent No.: US 11,691,320 B2
(45) Date of Patent: Jul. 4, 2023

(54) APPARATUS AND METHOD FOR MOLDING A FOAM PAD WITH A WIRE ASSEMBLY

(71) Applicant: Magna Seating Inc, Aurora (CA)

(72) Inventors: Christopher John Meurer, Taylorsville, KY (US); Ricky Brown, Louisville, KY (US); Bryan Keith Caskey, Coxs Creek, KY (US); Russel Eugene Strang, Danville, KY (US)

(73) Assignee: Magna Seating Inc, Aurora (CA)

( * ) Notice: Subject to any disclaimer, the term of this patent is extended or adjusted under 35 U.S.C. 154(b) by 54 days.

(21) Appl. No.: 16/842,912

(22) Filed: Apr. 8, 2020

(65) Prior Publication Data

US 2020/0324443 A1  Oct. 15, 2020

Related U.S. Application Data

(60) Provisional application No. 62/831,432, filed on Apr. 9, 2019.

(51) Int. Cl.
  *B29C 44/58* (2006.01)
  *B29C 44/12* (2006.01)
(52) U.S. Cl.
  CPC .......... *B29C 44/1266* (2013.01); *B29C 44/58* (2013.01)
(58) Field of Classification Search
  CPC ..................... B29C 44/58; B29C 44/1266
  See application file for complete search history.

(56) References Cited

U.S. PATENT DOCUMENTS

| | | | |
|---|---|---|---|
| 3,531,552 A | | 9/1970 | Getz et al. |
| 5,176,425 A | * | 1/1993 | Sakamoto ................ A47C 7/20 297/452.18 |
| 5,400,490 A | | 3/1995 | Burchi |
| 8,172,318 B2 | | 5/2012 | Kruger et al. |
| 9,167,901 B2 | | 10/2015 | Suenaga et al. |
| 2010/0327647 A1 | * | 12/2010 | Galbreath ............ B60N 2/7035 297/452.55 |
| 2013/0181499 A1 | * | 7/2013 | Suenaga ............. B29C 44/1271 264/48 |

FOREIGN PATENT DOCUMENTS

JP    S6168211    * 9/1984

* cited by examiner

*Primary Examiner* — Nahida Sultana
*Assistant Examiner* — Debjani Roy
(74) *Attorney, Agent, or Firm* — Miller Canfield

(57) ABSTRACT

An apparatus for molding a foam pad with a wire assembly for an automotive vehicle includes a mold bowl operably coupled to a mold lid to define a mold cavity therebetween. The mold bowl includes a bottom surface and a peripheral wall extending upwardly from and encircling the bottom surface. A plurality of wire holders extend inwardly from and are spaced around the peripheral wall for vertically positioning the wire assembly within the mold cavity. A holding element, such as an arcuate recess, is disposed along an upper ledge of at least one of the wire holders for horizontally positioning the wire assembly within the mold cavity. The mold cavity receives a foam material for filling the mold cavity and surrounding the wire assembly to form the foam pad with the wire assembly embedded therein.

16 Claims, 5 Drawing Sheets

APPARATUS AND METHOD FOR MOLDING A FOAM PAD WITH A WIRE ASSEMBLY

CROSS-REFERENCE TO RELATED APPLICATIONS

This application claims priority to and all the benefits of U.S. Provisional Application 62/831,432, filed on Apr. 9, 2019, which is hereby incorporated by reference in its entirety.

BACKGROUND OF THE INVENTION

1. Field of the Invention

The present invention relates to an apparatus and method for molding a foam pad with a wire assembly for an automotive vehicle.

2. Description of Related Art

Apparatuses for molding a foam pad with a wire assembly for an automotive vehicle are known in the art. Typical molding apparatuses include a mold bowl having a bottom surface and a peripheral wall extending therefrom. A mold lid having a top surface is operably coupled to the mold bowl to define a mold cavity therebetween. At least one post extends from the bottom surface of the mold bowl to hold the wire assembly within the mold cavity between the bottom surface of the mold bowl and the top surface of the mold lid. However, typical molding apparatuses create voids in the foam pad because the posts extending from the bottom surface of the mold bowl leave holes, channels and/or openings in the foam pad. These voids can cause weak areas or tears in the foam pad.

SUMMARY OF THE INVENTION

According to one aspect of the present invention, an apparatus is provided for molding a foam pad with a wire assembly in an automotive vehicle. The apparatus includes a mold bowl having a bottom surface and a peripheral wall extending therefrom. A mold lid having a top surface is operably coupled to the mold bowl to define a mold cavity therebetween. At least one wire holder extends inwardly from the peripheral wall. The wire holder includes an upper ledge for vertically positioning the wire assembly within the mold cavity between the bottom surface of the mold bowl and the top surface of the mold lid. A holding element is disposed along the upper ledge for horizontally positioning the wire assembly within the mold cavity spaced from the peripheral wall of the mold bowl.

According to another aspect of the present invention, an apparatus is provided for molding a foam pad with a wire assembly in an automotive vehicle. The apparatus includes a mold bowl having a bottom surface and a peripheral wall extending therefrom. A mold lid having a top surface is operably coupled to the mold bowl to define a mold cavity therebetween. At least one wire holder extends inwardly from the peripheral wall. The wire holder includes an upper ledge for vertically positioning the wire assembly within the mold cavity between the bottom surface of the mold bowl and the top surface of the mold lid. The wire holder further includes a holding element disposed along the upper ledge for horizontally positioning the wire assembly within the mold cavity spaced from the peripheral wall of the mold bowl.

According to yet another aspect of the present invention, a method is provided for manufacturing a foam pad with a wire assembly. The method for manufacturing the foam pad with the wire assembly includes steps of: providing a mold bowl having a bottom surface and a peripheral wall extending therefrom, the mold bowl including at least one wire holder extending radially inwardly from the peripheral wall and a holding element disposed along an upper ledge of the wire holder; providing a mold lid having a top surface, the mold bowl and mold lid operably couplable to define a mold cavity therebetween for shaping the foam pad therein; placing the wire assembly on the upper ledge of the wire holder to vertically position the wire assembly within the mold cavity between the bottom surface of the mold bowl and the top surface of the mold lid; placing the wire assembly on the holding element to horizontally position the wire assembly within the mold cavity spaced from the peripheral wall of the mold bowl; dispensing a foam material into the mold cavity; coupling the mold lid to the mold bowl; and allowing the foam material to expand to fill the mold cavity to form the foam pad with the wire assembly embedded therein.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
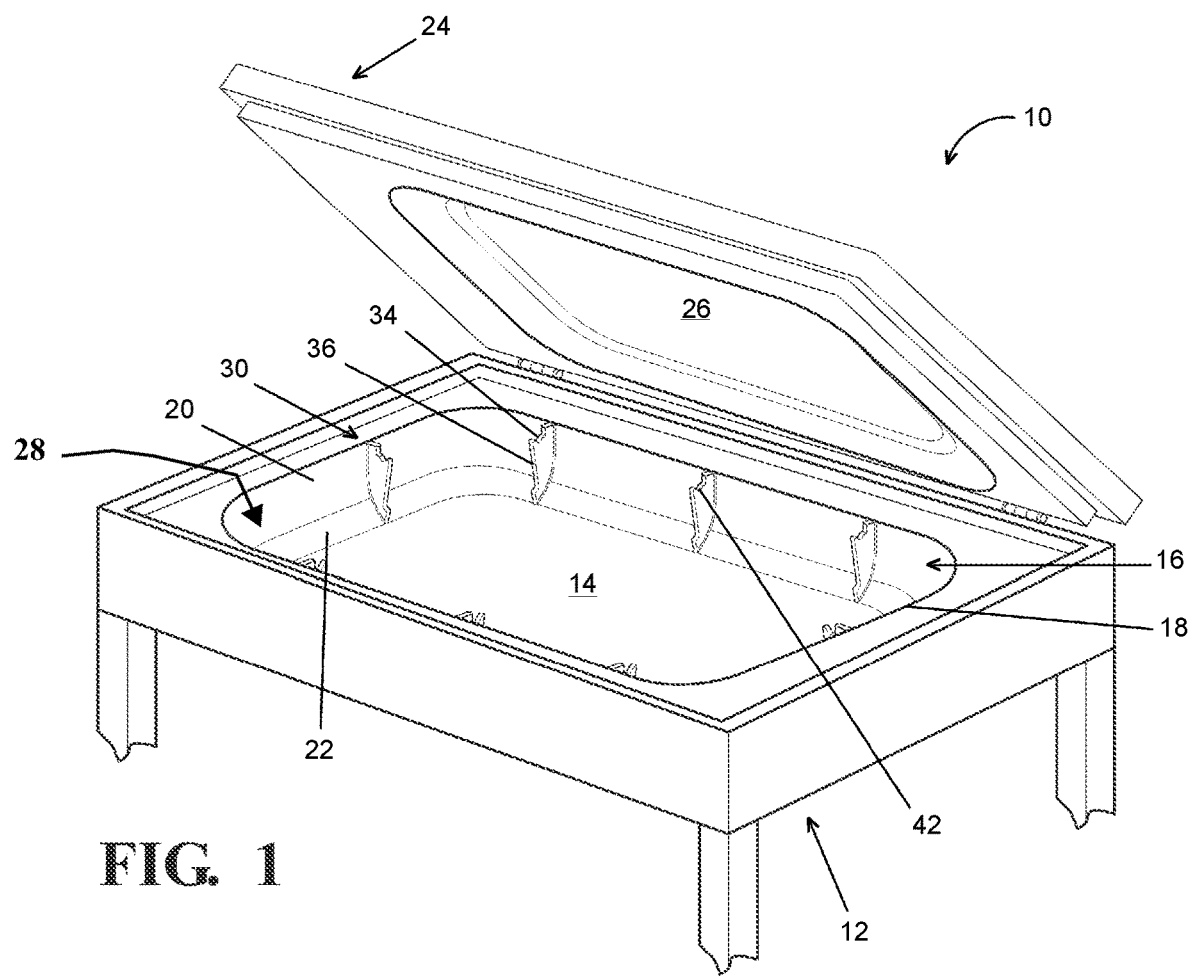
FIG. 1 is a perspective view of an apparatus for molding a foam pad with a wire assembly for an automotive vehicle according to one embodiment of the present invention.

Referring to the Figures, wherein like numerals indicate like or corresponding parts throughout the several views, an apparatus for molding a foam pad with a wire assembly for an automotive vehicle is shown generally at 10. The apparatus 10 includes a mold bowl 12 with a bottom surface 14. A peripheral wall 16 extends upwardly from and encircles the bottom surface 14, terminating at a top edge 18 of the mold bowl 12. The peripheral wall 16 has an upper portion 20 disposed adjacent the top edge 18 of the mold bowl 12 and a lower portion 22 disposed adjacent the bottom surface 14 of the mold bowl 12. Referring to FIG. 1, the apparatus also includes a mold lid 24 with a top surface 26. The mold lid 24 is operably coupled to the mold bowl 12 to define a mold cavity 28 therebetween. Dimensions of the mold cavity 28 ultimately vary depending on a desired design of the foam pad 29 being produced, and it is therefore to be appreciated that the mold cavity 28 may also vary in shape and size without varying the scope of the invention. A plurality of wire holders 30 extend from the peripheral wall 16 of the mold bowl 12 for positioning a wire assembly 32 within the mold cavity 28. The mold cavity 28 ultimately receives a liquid urethane foam material 27 to form the foam pad 29, therefore embedding the wire assembly 32 within the foam pad 29 to provide structural support. The wire assembly 32 is generally an elongated metal rod, bar, or wire having a predetermined length and shape or pattern as may be desired to be embedded in the foam pad 29 to provide structural support and some rigidity and stability to the formed foam pad 29.

Figure 2:
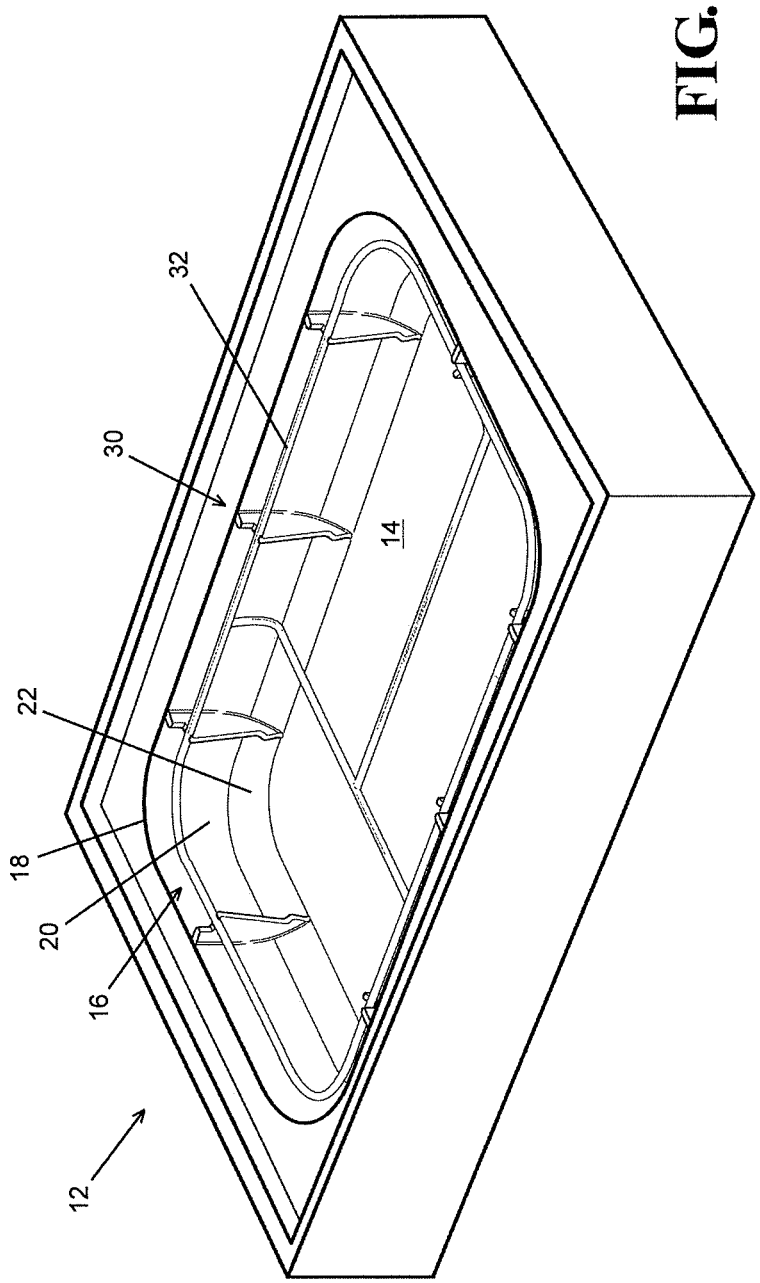
FIG. 2 is a perspective view of a mold bowl of the apparatus of FIG. 1.
Figure 3:
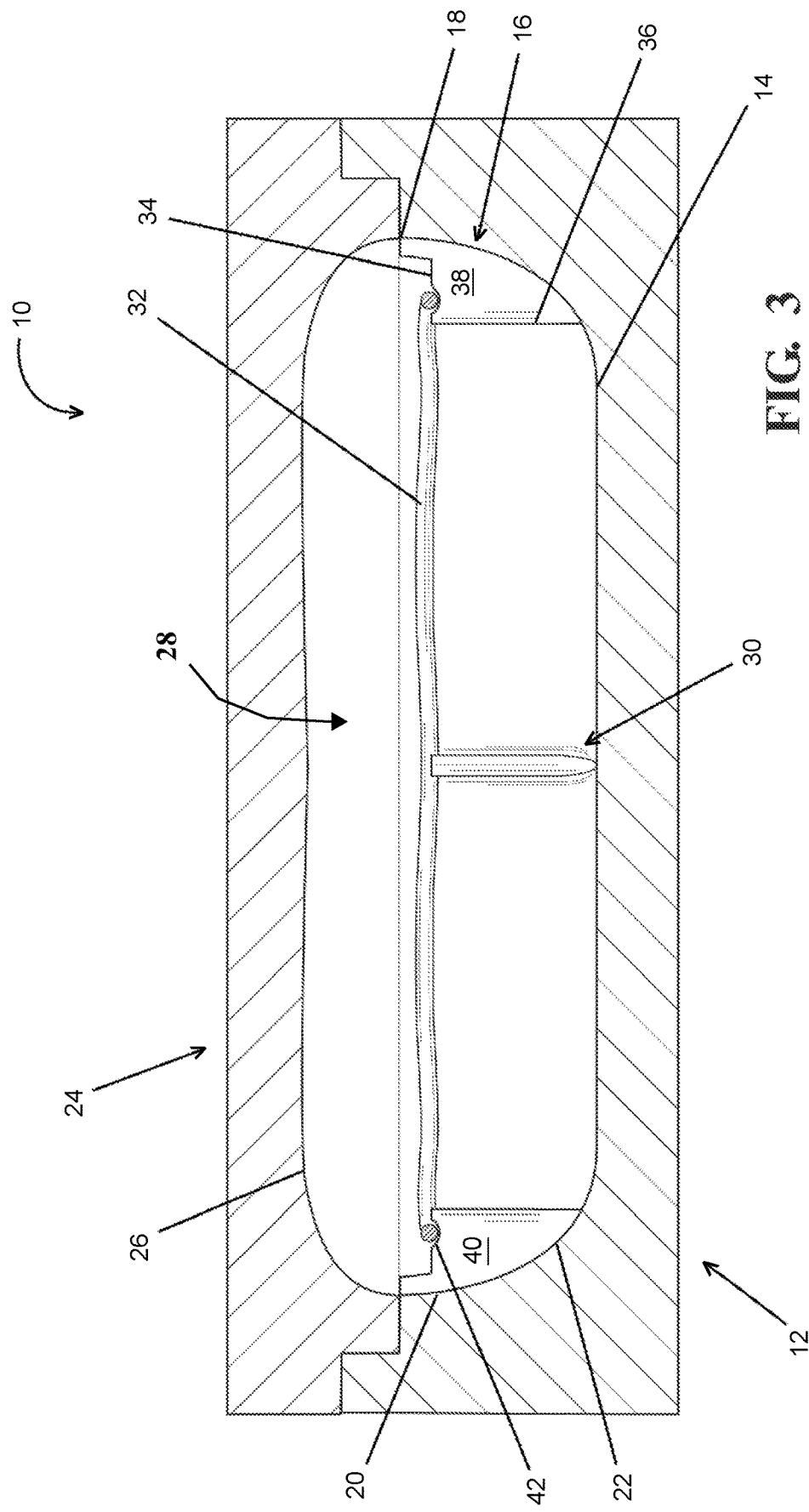
FIG. 3 is a cross-sectional view of the apparatus of FIG. 1 with a mold lid coupled to the mold bowl to define a mold cavity therebetween.

As shown in FIG. 2, the mold bowl 12 includes a plurality of wire holders 30 spaced apart around the peripheral wall 16. Depending on the design of the foam pad 29 being produced and the corresponding wire assembly 32 required for providing support to the foam pad 29, the mold bowl 12 may include any number of wire holders 30 that are necessary to adequately position the wire assembly 32 within the mold bowl 12 without varying the scope of the invention. Similarly, the wire holders 30 may be spaced apart around the peripheral wall 16 in any number of ways that are necessary to adequately position the wire assembly 32 within the mold bowl 12 without varying the scope of the invention. Referring to FIG. 3, each wire holder 30 extends into the mold cavity 28 from the peripheral wall 16 and includes a narrow upper ledge 34 intersecting a narrow medial edge 36. The medial edges 36 of the wire holders 30 extend vertically from the lower portion 22 of the peripheral wall 16, and the upper ledges 34 of the wire holders 30 extend horizontally from the upper portion 20 of the peripheral wall 16.

In one embodiment of the apparatus 10, the medial edges 36 intersect the upper ledges 34 at a substantially perpendicular angle, as shown in FIGS. 1-4. However, it is to be appreciated that the medial edges 36 and the upper ledges 34 can intersect at any suitable angle without varying the scope of the invention. Each wire holder 30 further includes opposite and substantially planar first and second sides 38, 40 bound by the upper ledge 34, medial edge 36, and the peripheral wall 16, best shown in FIG. 3. The substantially planar first and second sides 38, 40, upper ledge 34, and medial edge 36 of each wire holder 30 form a narrow slot in the foam pad 29 rather than a deep cavity or void, thereby reducing tearing of the foam pad 29 when removed from the mold cavity 28.

Figure 4:
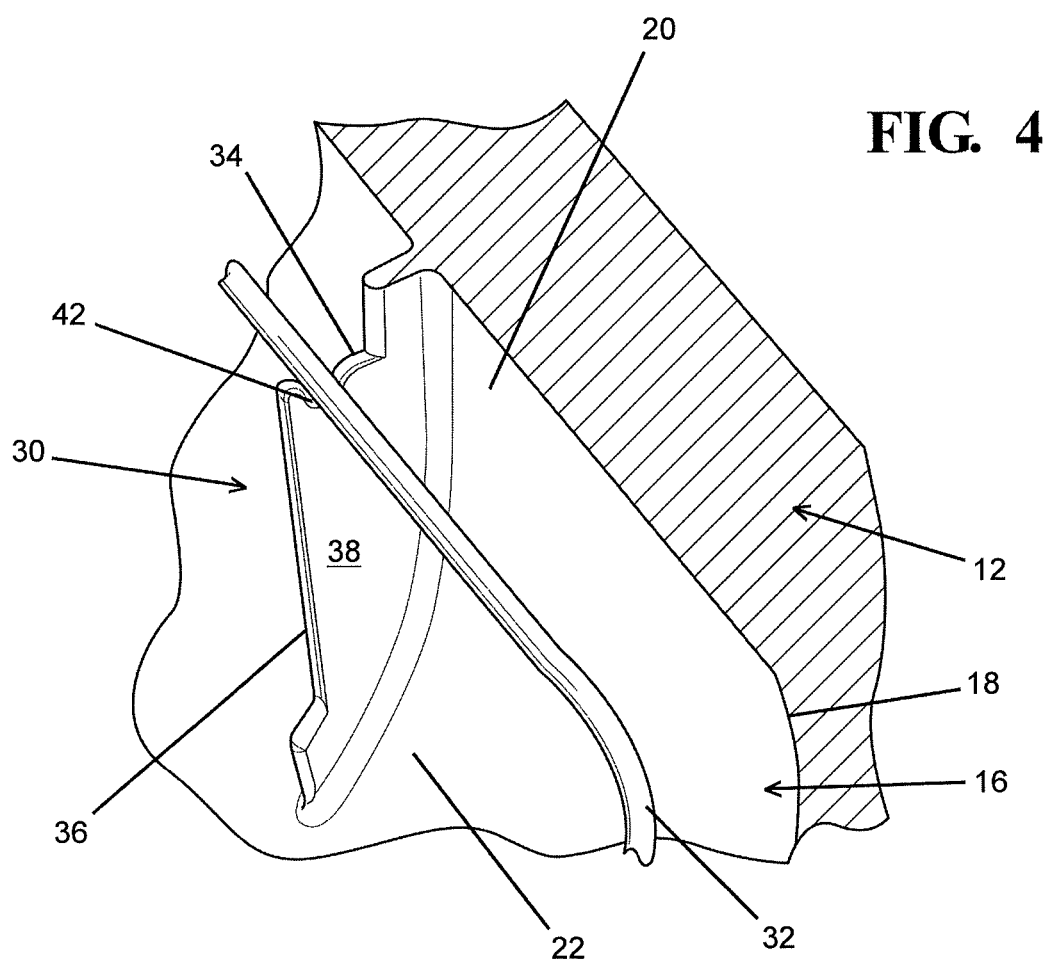
FIG. 4 is an enlarged fragmentary perspective view of a wire holder of the apparatus of FIG. 1.

Referring to FIG. 4, the upper ledge 34 of each wire holder 30 is spaced from the top edge 18 of the peripheral wall 16 for vertically positioning the wire assembly 32 within the mold cavity 28 between the bottom surface 14 of the mold bowl 12 and the top surface 26 of the mold lid 24. Spacing of the wire holders 30 from the top edge 18 of the peripheral wall 16 may vary depending on the desired design of the foam pad 29 being produced and the corresponding position of the wire assembly 32 within the foam pad 29 necessary to provide sufficient support to the foam pad 29. Therefore, spacing of the upper ledge 34 from the top edge 18 of the peripheral wall 16 may vary between each wire holder 30 without varying the scope of the invention.

Referring to FIGS. 3 and 4, a holding element 42 is disposed along the upper ledge 34 of at least one wire holder 30. The holding element 42 horizontally positions and spaces the wire assembly 32 within the mold cavity 28 between the peripheral wall 16 encircling the bottom surface 14 the mold bowl 12. In one embodiment, shown in FIGS. 1-4, the holding element 42 is an arcuate recess extending into the upper ledge 34 of the wire holder 30 to cradle the wire assembly 32 and prevent horizontal movement of the wire assembly 32 within the mold cavity 28. However, it is to be appreciated that any suitable means for horizontally positioning and spacing the wire assembly 32 within the mold cavity 28 may be used without varying the scope of the invention. For example, the holding element 42 may include one or more protrusions extending from the wire holder 30 to engage the wire assembly 32, thereby preventing horizontal movement of the wire assembly 32 between the peripheral wall 16 encircling the bottom surface 14 of the mold bowl 12 within the mold cavity 28.

In operation, to form the foam pad 29, an operator first loads the wire assembly 32 into the mold bowl 12 by placing the wire assembly 32 on the upper ledges 34 of the wire holders 30 extending from the peripheral wall 16 of the mold bowl 12, thereby vertically positioning the wire assembly 32 within the mold cavity 28 between the mold bowl 12 and the top surface 26 of the mold lid 24. The operator also positions the wire assembly 32 in the holding element 42, such as an arcuate recess in the wire holder 30, to horizontally position the wire assembly 32 within the mold cavity 28 between the peripheral wall 16 encircling the bottom surface 14 of the mold bowl 12, thereby securing and preventing movement of the wire assembly 32 within the mold cavity 28. The mold cavity 28 is shaped to reflect the desired design of the foam pad 29 being produced, and therefore, the peripheral wall 16, top surface 26 of the mold lid 24, and bottom surface 14 of the mold bowl 12 may all vary in shape and size between applications of the apparatus 10. Similarly, positioning and quantity of the wire holders 30 extending from the peripheral wall 16 into the mold cavity 28 correspond to the wire assembly 32 required to adequately support the foam pad 29 being produced, and may therefore also vary between applications of the apparatus 10.

Figure 5:
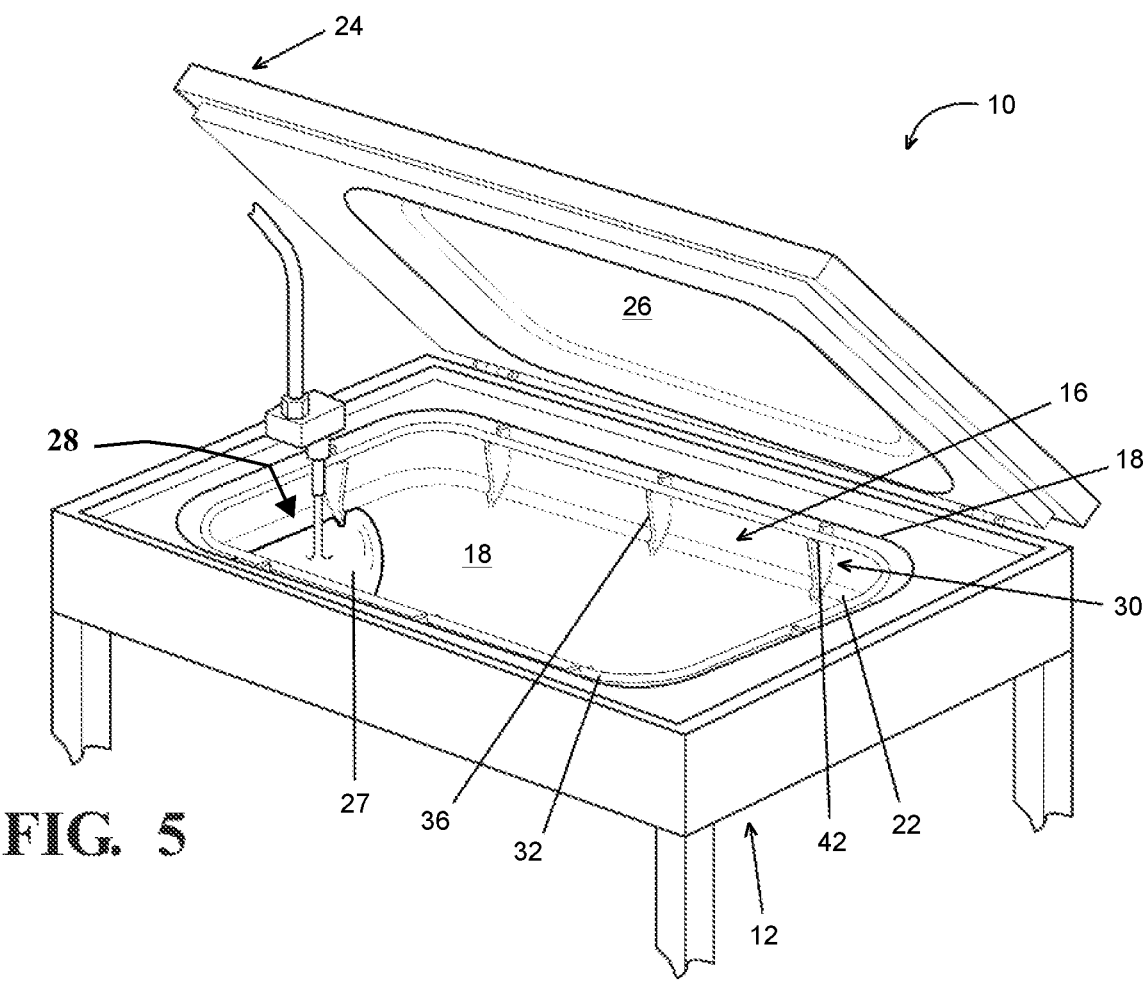
FIG. 5 is a perspective view of the apparatus of FIG. 1 shown dispensing a foam material into the mold cavity.
Figure 6:
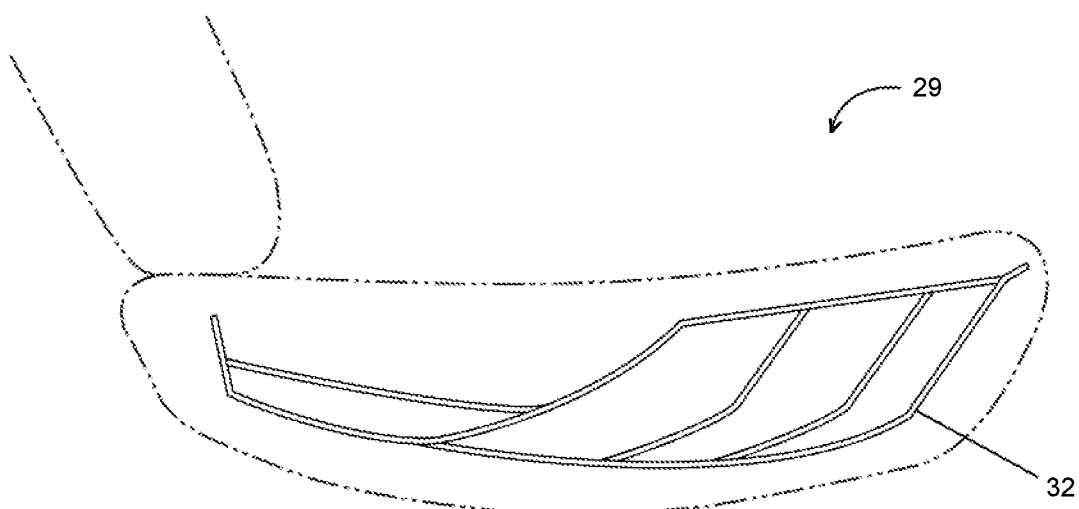
FIG. 6 is a fragmentary cross-sectional view of a foam pad with a wire assembly embedded therein.

Referring to FIG. 5, the foam material 27 capable of expanding to fill the mold cavity 28 and surround the wire assembly 32 is then dispensed into the mold bowl 12. The foam material 27 may be liquid urethane foam or the like as is commonly known in the art for forming an automotive seat cushion or seat back. Once the foam material 27 is dispensed into the mold bowl 12, the mold lid 24 is coupled to the mold bowl 12 to fully enclose and seal the mold cavity 28. The foam material 27 subsequently expands to fill the mold cavity 28 and surround the wire assembly 32, thereby embedding the wire assembly 32 within the foam pad 29 and shaping the foam pad 29 to match the mold cavity 28. Once the foam material 27 has expanded and solidified, the mold lid 24 is uncoupled from the mold bowl 12. The foam pad 29 is then removed from the mold bowl 12, and the wire assembly 32, now embedded in the foam pad 29, is correspondingly displaced from the wire holders 30, as shown in FIG. 6. Removing the foam pad 29 from the mold bowl 12 creates narrow slots instead of deep cavities in the foam pad 29 where the wire holders 30 were previously disposed for supporting the wire assembly 32, therefore limiting tearing of the foam pad 29 when removed from the mold bowl 12.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. An apparatus for molding a foam pad with a wire assembly for an automotive vehicle, the apparatus comprising:
   a mold bowl having a bottom surface and a peripheral wall extending upwardly therefrom, the peripheral wall encircling the bottom surface and terminating at a top edge of the mold bowl;
   a mold lid having a top surface and operably coupled to the mold bowl to define a mold cavity therebetween;
   at least one wire holder extending inwardly from the peripheral wall of the mold bowl, the wire holder including an upper ledge for vertically positioning the wire assembly within the mold cavity between the bottom surface of the mold bowl and the top surface of the mold lid; and
   a holding element disposed along the upper ledge of the wire holder for horizontally positioning the wire assembly within the mold cavity spaced from the peripheral wall of the mold bowl.

2. The apparatus of claim 1 wherein the holding element is a recess in the upper ledge of the wire holder for accepting and retaining the wire assembly.

3. The apparatus of claim 2 wherein the upper ledge of the wire holder extends horizontally from an upper portion of the peripheral wall.

4. The apparatus of claim 3 wherein the wire holder further includes a medial edge extending vertically from a lower portion of the peripheral wall to intersect the upper ledge.

5. The apparatus of claim 4 wherein the wire holder further includes opposite and substantially planar first and second sides adapted for creating a narrow slot in the foam pad.

6. The apparatus of claim 5 wherein the medial edge of the wire holder intersects substantially perpendicularly with the upper ledge.

7. The apparatus of claim 6 wherein the upper ledge of the wire holder is vertically spaced from the top edge of the peripheral wall disposed opposite the bottom surface of the mold bowl.

8. The apparatus of claim 7 further comprising a plurality of wire holders spaced apart around the peripheral wall of the mold bowl.

9. An apparatus for molding a foam pad with a wire assembly for an automotive vehicle, the apparatus comprising:
   a mold bowl having a bottom surface and a peripheral wall extending upwardly therefrom, the peripheral wall encircling the bottom surface and terminating at a top edge of the mold bowl;
   a mold lid having a top surface and operably coupled to the mold bowl to define a mold cavity therebetween; and
   at least one wire holder extending radially inwardly from the peripheral wall of the mold bowl, the wire holder including an upper ledge for vertically positioning the wire assembly within the mold cavity between the bottom surface of the mold bowl and the top surface of the mold lid, and a holding element disposed along the upper ledge of the wire holder for horizontally positioning the wire assembly within the mold cavity spaced from the peripheral wall of the mold bowl.

10. The apparatus of claim 9 wherein the holding element is a recess in the upper ledge of the wire holder for accepting and retaining the wire assembly.

11. The apparatus of claim 10 wherein the upper ledge of the wire holder extends horizontally from an upper portion of the peripheral wall.

12. The apparatus of claim 11 wherein the wire holder further includes a medial edge extending vertically from a lower portion of the peripheral wall to intersect the upper ledge.

13. The apparatus of claim 12 wherein the wire holder further includes opposite and substantially planar first and second sides adapted for creating a narrow slot in the foam pad.

14. The apparatus of claim 13 wherein the medial edge of the wire holder intersects substantially perpendicularly with the upper ledge.

15. The apparatus of claim 14 wherein the upper ledge of the wire holder is vertically spaced from the top edge of the peripheral wall disposed opposite the bottom surface of the mold bowl.

16. The apparatus of claim 15 further comprising a plurality of wire holders spaced apart around the peripheral wall of the mold bowl.

* * * * *